United States Patent [19]

Lawson

[11] Patent Number: 5,356,466
[45] Date of Patent: Oct. 18, 1994

[54] ANTI-SLIP AGENTS

[76] Inventor: Michael B. Lawson, 2618 N. Broadway, Shawnee, Okla. 74801

[21] Appl. No.: 36,516

[22] Filed: Mar. 18, 1993

[51] Int. Cl.$^5$ .................................................. C09K 3/14
[52] U.S. Cl. ................... 106/36; 260/998.13; 106/14.22
[58] Field of Search ............ 260/998.13; 106/36, 106/14.12, 14.22

[56] References Cited

U.S. PATENT DOCUMENTS

| | | | |
|---|---|---|---|
| 103,034 | 5/1870 | Eaton | 106/36 X |
| 822,005 | 5/1906 | Leonard | 106/36 |
| 1,958,220 | 5/1934 | Webb | 106/36 X |
| 2,194,988 | 3/1940 | Schülein | 106/36 |
| 3,598,677 | 8/1971 | Bergmeister | 106/36 |
| 3,879,388 | 4/1975 | Varsanyi | 106/36 |
| 3,962,168 | 6/1976 | Edwards | 260/998.13 |

Primary Examiner—Karl Group
Assistant Examiner—Chris Gallo

[57] ABSTRACT

A novel class of chemical compounds has been discovered that has the ability to prevent slippage between surfaces in intimate contact. One immediate application of the compounds is their utility when applied to the rubber V-belts used on the fan belts of automobiles. The compounds are non-toxic, easy to apply and readily available.

14 Claims, 3 Drawing Sheets

ANTI-SLIP AGENTS

BACKGROUND OF THE INVENTION

1. Field of the Invention

This invention relates to a group of chemical compounds that can be used to increase the friction between a belt and pulley. The applications include v-belt/pulley systems found in automobiles but is not restricted to this. Wherever there are two surfaces in contact that move, such that one surface exerts a frictional force to make the other move in the same direction, the possibility exists that slippage will occur between the surfaces. Many attempts have been made to try to prevent this phenomenon from occurring. However, one member of the group in a direct field test comparison was so superior to commercially available compounds that are now used that it is believed that a new and useful compound has been discovered that can be used to solve this commonly encountered problem.

2 Description of the Prior Art

Prior art consists of using polymerizates of olefinic unsaturated compounds which form adhesive films at low temperatures for securing stacked packages against slipping. For example, Bergmeister, et al. in U.S. Pat. No. 3,598,677 describe the use of aqueous dispersions of vinyl acetate and vinyl laurate, inter al., for application to the sides of packages during stacking. The anti-slipping agents can be applied by spraying or brushing on and are described as being particularly useful for paper bags, cartons made of full or corrugated cardboard, folding boxes, and other packaging materials made of paper or cardboard. The compositions in U.S. Pat. No. 3,598,677 require considerable effort to formulate and mix because they are composed of several constituents. Further, these formulations are used on static systems as an adhesive and not on moving systems. These formulations also require a drying or set time of from 30 minutes to one (1) hour.

Vasanyi and Roth in U.S. Pat. No. 3,879,388 describe the use of 2-guanadino-4,6-bis-amino-s-triazine as well as quarternary and acid addition salts of certain of the s-triazines as components in surface treating agents, especially in combination with natural and synthetic waxes, resins, silicones, inorganic and organic fillers, detergents and other surfactants, proments, and stabilizing agents. The treated surfaces show high gloss and often antislip effects result. These s-triazines are also described as being useful as textile softeners. Three of the four examples used in U.S. Pat. No. 3,879,388 are complex mixtures of waxes, surfactants, and detergents and these examples describe that the resultant emulsion is excellently suited for the care of modern flooring. The fourth example describes a triazine compound mixed with 95 parts of glacial acetic acid for use as a textile softening solution. Once again, a tedious and work intensive formulation is described for use on static flooring systems. Here the primary function is to wax floors. In only one example is the wax described as affecting slipping. There the floor is described as being less slippery, not as a floor where slipping is prevented. The triazine molecules described in U.S. Pat. No. 3,879,388 are radically different from lecithin and obviously do not perform the same function, viz.. of preventing slippage in mechanical systems where high velocities of the surfaces in intimate contace are achieved.

Edwards in U.S. Pat. No. 3,962,168 describes a non-skid coating composed of a compatible mixture of styrene acrylate polymers and polyvinyl acetate-acrylic co-polymers in a compatible organic-aqueous solvent system. Various pigments, fillers, and extenders, such as clays, carbon blacks, and pulverized rubber may be added to the mixture and subsequently milled to produce a stable coating composition. The coating is described in only one(1) of the 10 examples for use on cold rolled steel. The other examples where the composition was applied described the compositions use on plywood. A 24 hour curing period at ambient temperature is described in the examples. This patent is directed, once again, to a static system such as a floor or walkway. A filler seems to be a very desirable constituent to produce the non-skid properties, e.g., in claim 2 a particulate, resilient rubber material is incorporated in the coating material at a level of between about 5 and 10% by weight. This patent does not lend itself to the easy application of moving surfaces such as belt and pulley systems where an immediate cessation of slipping is desired. Further, the compositions of U.S. Pat. No. 3,962,168 uses fillers which may unnecessarily abrade the surfaces in contact. A difficult milling period is used to blend the constituents in U.S. Pat. No. 3,962,168.

SUMMARY OF THE INVENTION

The anti-slip agent is lecithin or a derivative of lecithin. Generally, lecithin is considered non-toxic and is even used in food-stuffs. The toxicity of derivatives of lecithin may vary.

Lecithin is a complex mixture of phospholipids. Despite its complex composition and natural source sophisticated analytical techniques have shown the major phospholipids and fatty acid composition of lecithins to be very consistent.

Figure 1:
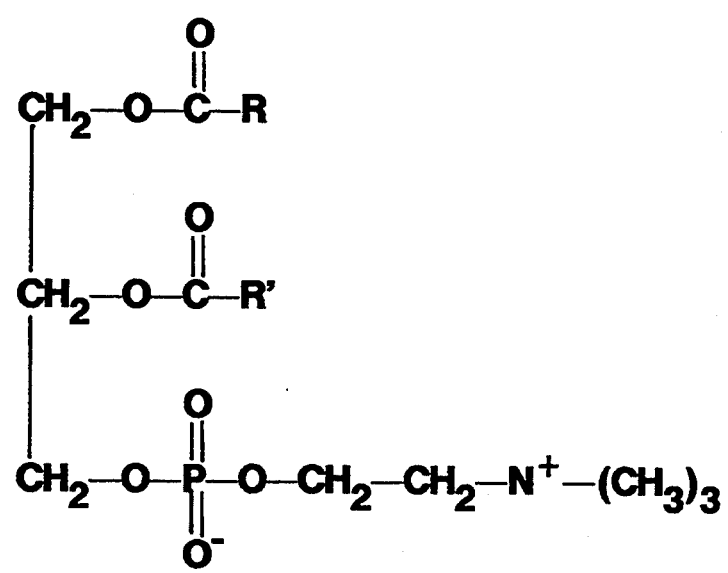
FIGS. 1-3 represent the major components of lecithin
Figure 2:
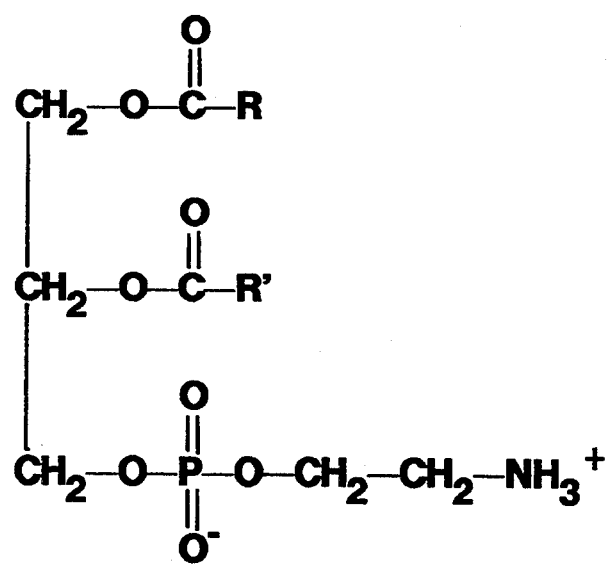
Figure 3:
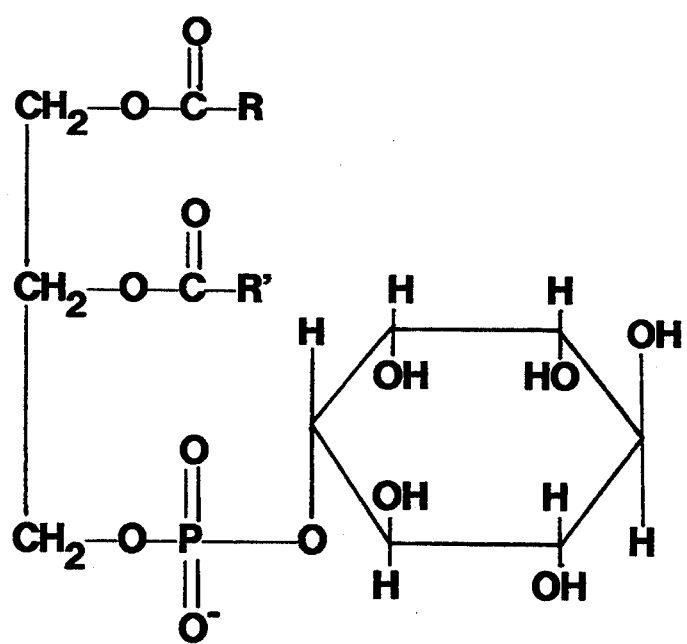

| Phospholipid Composition | |
| --- | --- |
| Type | As % Acetone Insoluble |
| Phosphatidylcholine | 23% |
| Phosphatidylethanolamine | 20% |
| Phosphatidylinositol | 14% |
| Phosphatidic Acid | 8% |

Lecithin's major components, viz.. phosphatidylcholine, phosphatidylethanolamine, and phosphatidylinositol, have a structure of a triglyceride with a functional group replacing the fatty acid on the third carbon.

| | Typical Analysis | |
| --- | --- | --- |
| | Fluid Lecithin Std. Grade | Oil Free Granular |
| Density at 25 C | 0.97 g/cc | 0.4 g/cc |
| Ash | 6% | 8.5% |
| Free Fatty Acid (unbound) | 1-4% | 0-1% |
| Fatty Acid Content (g/100 g) | 66 | 60 |
| Fatty Acid Composition (relative) of Total | | |
| Palmitic | 15.6% | 20.3% |
| Stearic | 4.7% | 4.6% |
| Oleic | 17.9% | 9.2% |
| Linoleic | 54.0% | 58.9% |

-continued

|  | Typical Analysis | |
|---|---|---|
|  | Fluid Lecithin Std. Grade | Oil Free Granular |
| Linolenic | 6.7% | 7.0% |
| Other Fatty Acids | 1.1% | 0.0% |
| Elemental Analysis | | |
| Phosphorus | 2.0% | 3.0% |
| Nitrogen | 0.7% | 1.0% |
| Potassium | 0.4% | 0.8% |
| Calcium | 0.04% | 0.7% |
| Magnesium | 0.06% | 0.09% |
| Sodium | 0.01% | 0.03% |
| Mixed Tocopherols | 1000 ppm | 500 ppm |

EXPERIMENTAL

(1) Laboratory Testing

The coefficient of friction between a rubber mat and a steel surface was determined with and without various lecithin compounds. A simple spring scale was used to determine the force required to slide the steel plate over the rubber mat. Between determinations of the coefficient of sliding friction the rubber mat and the steel plate were washed with Ivory liquid soap and dried. Ten mls. of fluid were smeared over the central part of the rubber mat and the bottom of the steel plate. The steel plate was then pulled over the rubber mat and the pulling force necessary to maintain motion was measured using a dial spring scale purchased from OHAUS Scale Corporation. An average of five determinations was made and this average was used in the calculation of the coefficient of sliding fraction:

$$\mu = \frac{\text{sliding force}}{\text{wt. of steel plate}}$$

The results of these experiments are shown in Table 1. Using the values of the blanks the standard sample deviation is 0.085. The mean of the six tests with no additive to the rubber mat is 0.96. On this basis if a value less than or equal to 0.71 or greater than or equal to 1.21 for the coefficient of sliding friction is found, one is 99% confident that there is an effect attributable to the additive between the steel plate and the rubber mat. On this basis the following discussion results. Canola cooking oil lubricates the surfaces and makes it easier to slide the steel plate across the rubber mat. This would be expected for most oily compounds. All of the lecithin compounds make it more difficult to slide the steel plate across the rubber mat. The most effective anti-slip agent is the hydroxylated lecithin compound shown in experiment 8.

The least effective lecithin compound was the one shown in Experiment 6. The other compounds showed varying degrees of efficacy.

(2) Field Testing

Test #1) Considerable effort was expended on trying to stop belt slippage in a 1980 Dodge Pick-Up Truck. The truck had a V-8 engine (318 cubic displacement) that was equipped with an air conditioner compressor. A two-belt configuration was used to go around the crankshaft, alternator, and air conditioner pulleys. The problem was that the belts were not matched and it was impossible to stop the slippage even after much effort to tighten the belts at various tensions. After several applications of commercially available belt dressing compounds, the belts still slipped such that at speed of greater than 45 mph there was a highly audible squeel produced by the belts. Finally the pullyes were cleaned with a solvent to remove old belt dressing compound. The pulleys were wiped clean and dry. New belts were installed and tested. The squeel persisted at this stage. Subsequently, the two belts were rubbed with liquid lecithin.

The squeel immediately stopped. The effect was so nice, and worked so well, and was so superior to the commercially available compounds that it is believed that a new and useful compound has been discovered that can be used to solve this commonly encountered problem in automobile repair and maintenance. Lecithin is useful because it is non-toxic, and it is not necessary to use it in an aerosol formulation for it to be effective. Hence, no special safety considerations are necessary in its handling or use. Further, it works as was dramatically demonstrated by this field test.

Test #2) A second field test further demonstrated the efficiency of one of the lecithin compounds in stopping belt slippage. A small hand-held Hoover vacuum sweeper had stopped working. It was partially disassembled and examined. Two things were keeping it from working properly. The air passage was clogged, and the brush roller was not turning because the rubber belt that turned it was severly slipping on the metal shaft of the motor.

The passageway was cleaned and the surface of the rubber belt that contacts the motor shaft and the brush roller was coated with the hydroxylated lecithin that was used in Experiment #8 of Table 1. After reassembling the vacuum sweeper worked beautifully. The impeller pulled a good vacuum and the brush roller worked very well. This example of field testing demonstrates that the anti-slip compounds work on the systems other than automobile belt and pulley systems.

TABLE 1

| Coefficient of Friction of Various Lecithins | | | | | |
|---|---|---|---|---|---|
| Exp. # | Vol. | Agent | Plate Wt. (g) | Sliding Force (g) | Coef. |
| 1 | 0 | none | 148 | 138 | .91 |
| 2 | 10 | Hollywood Canola Oil | 148 | 103 | .70 |
| 3 | 0 | none | 148 | 145 | .98 |
| 4 | 10 | SAMPLE A Lecithin | 148 | 235 | 1.60 |
| 5 | 0 | none | 149 | 146 | 0.98 |
| 6 | 10 | SAMPLE B Lecithin | 149 | 181 | 1.21 |
| 7 | 0 | none | 149 | 135 | .91 |
| 8 | 10 | Hydroxylated Lecithin | 149 | 280 | 1.95 |
| 9 | 0 | none | 149 | 140 | .94 |
| 10 | 10 | SAMPLE C Lecithin | 149 | 231 | 1.55 |
| 11 | 0 | none | 149 | 160 | 1.07 |
| 12 | 10 | SAMPLE D Lecithin | 149 | 238 | 1.60 |

I claim:

1. A method for the prevention of slippage in systems comprising coating lecithin or compounds thereof on surfaces that are in intimate contact with each other.

2. The method of claim 1 where the lecithin contains alkyl chains of from 1 to 20 atoms in length.

3. The method of claim 2 wherein said surfaces comprise a belt and shaft system.

4. The method of claim 3 wherein said system is attached to a motor or engine.

5. The method of claim 3 wherein the belt is made of rubber, rubber composite material, or other elastomer material with or without strengthening filaments or fibers.

6. The method of claim 1, where said lecithin or compounds thereof contain alkyl chains of from 1 to 20 atoms in length with one or more hydroxyl (—OH) groups attached thereto.

7. A method for the prevention of slippage in systems comprising coating two surfaces with Phosphatidylcholine, phosphatidylethanolamine, phosphatidylinositol or compounds thereof separately or as mixtures as anti-slip agents when coated on surfaces that are in intimate contact with each other.

8. The method of claim 7, where the R and R' groups shown in FIG. 1 are alkyl chains of 1 to 20 carbon atoms in length.

9. The method of claim 8 wherein the system comprises a belt and shaft system.

10. The method of claim 9, where the belt is made of rubber, rubber composite material, or other elastomer material with or without strengthening filaments or fibers.

11. The method of claim 7, where said lecithin or compounds thereof contain alkyl chains of from 1 to 20 atoms in length with one or more hydroxyl (—OH) groups attached thereto.

12. The method of claim 11, wherein the system comprises a belt and shaft.

13. The method of claim 12, wherein the system comprises a rubber belt and pulley or shaft system attached to a motor or engine.

14. The method of claim 13, where the belt is made of rubber, rubber composite material, or other elastomer material with or without strengthening filaments or films.

* * * * *